(12) United States Patent
Wu (10) Patent No.: US 10,626,975 B2
(45) Date of Patent: Apr. 21, 2020

(54) SURFACE-REINFORCED CARBON FIBER TOOTHED STRUCTURE

(71) Applicant: Digirit Industry Co., Ltd., ChangHua County (TW)

(72) Inventor: Meng-Chang Wu, ChangHua County (TW)

(73) Assignee: Digirit Industry Co., Ltd., ChangHua County (TW)

( * ) Notice: Subject to any disclaimer, the term of this patent is extended or adjusted under 35 U.S.C. 154(b) by 317 days.

(21) Appl. No.: 15/582,821

(22) Filed: May 1, 2017

(65) Prior Publication Data

US 2017/0321793 A1 Nov. 9, 2017

(30) Foreign Application Priority Data

May 5, 2016 (TW) .............................. 105206399 U (51) Int. Cl.
*F16H 55/06* (2006.01)
*F16H 55/30* (2006.01)
*B62M 9/00* (2006.01)
*B32B 5/02* (2006.01)
*B32B 9/00* (2006.01)
*B32B 37/06* (2006.01)
(Continued)

(52) U.S. Cl.
CPC ............... *F16H 55/06* (2013.01); *B32B 5/02* (2013.01); *B32B 9/007* (2013.01); *B32B 37/06* (2013.01); *B32B 37/1018* (2013.01); *B62M 9/00* (2013.01); *F16H 55/30* (2013.01); *F16H 57/0031* (2013.01); *B32B 2305/10* (2013.01); *B32B 2305/30* (2013.01); *B32B 2313/04* (2013.01); *B62M 9/04* (2013.01); *B62M 9/121* (2013.01); *F16H 2055/065* (2013.01)

(58) Field of Classification Search
CPC .......... B62M 9/00; B62M 9/04; B62M 9/121; F16H 55/06; F16H 55/30; F16H 57/0031; F16H 2055/065; B32B 5/02; B32B 9/007; B32B 37/06; B32B 37/1018; B32B 2305/10; B32B 2305/30; B32B 2313/04
See application file for complete search history.

(56) References Cited

U.S. PATENT DOCUMENTS

5,074,828 A * 12/1991 Ellis ...................... B29C 70/347
474/161
10,267,718 B2 * 4/2019 Johnson .................... G01N 3/56
(Continued)

*Primary Examiner* — Michael R Mansen
*Assistant Examiner* — Robert T Reese
(74) *Attorney, Agent, or Firm* — Alan D. Kamrath; Karin L. Williams; Mayer & Williams PC (57) ABSTRACT

A carbon fiber toothed structure has a body. The body is circular and has a toothed segment and at least one carbon fiber cloth. The toothed segment is formed on an outer periphery of the body. The at least one carbon fiber cloth is deposited on a front side and a rear side of the body from a center to the outer periphery of the body to cover the toothed segment. The body is made by stacking multiple circular carbon fiber cloths of different diameters with each other. Some of the carbon fiber cloths deposited in the body have smaller diameters than those of the others of the carbon fiber cloths to enable the center of the body being thicker than the outer periphery of the body. The toothed segment has two guiding inclined planes respectively deposited on the front side and the rear side of the body.

8 Claims, 7 Drawing Sheets

(51) Int. Cl.
*B32B 37/10* (2006.01)
*F16H 57/00* (2012.01)
*B62M 9/121* (2010.01)
*B62M 9/04* (2006.01)

(56) References Cited

U.S. PATENT DOCUMENTS

| | | | | |
|---|---|---|---|---|
| 2002/0043124 A1* | 4/2002 | Shiga | ............... | B29C 45/16 |
| | | | | 74/434 |
| 2008/0202284 A1* | 8/2008 | Valle | ............... | B62M 3/00 |
| | | | | 74/594.1 |
| 2009/0042682 A1* | 2/2009 | Dal Pra' | ............... | F16H 55/30 |
| | | | | 474/160 |
| 2011/0138951 A1* | 6/2011 | Mashue | ............... | F16H 55/17 |
| | | | | 74/457 |
| 2015/0198231 A1* | 7/2015 | Emura | ............... | B62M 9/105 |
| | | | | 474/156 |
| 2015/0362057 A1* | 12/2015 | Wesling | ............... | F16H 55/06 |
| | | | | 474/152 |
| 2016/0114544 A1* | 4/2016 | Kunishima | ............... | B29C 70/462 |
| | | | | 74/460 |
| 2017/0101159 A1* | 4/2017 | Watarai | ............... | B21K 23/00 |
| 2018/0274651 A1* | 9/2018 | Gerhardt | ............... | F16H 55/30 |
| 2018/0320772 A1* | 11/2018 | Anand | ............... | F16H 55/02 |

* cited by examiner

SURFACE-REINFORCED CARBON FIBER TOOTHED STRUCTURE

BACKGROUND OF THE INVENTION

1. Field of Invention

The present invention relates to a carbon fiber toothed structure, and more particularly to a carbon fiber toothed structure that may be treated by a surface treatment to strengthen a surface of the carbon fiber toothed structure and to increase the life of the carbon fiber toothed structure.

2. Description of the Related Art

Conventional carbon fiber toothed structures are usually applied in the field of bicycle parts manufacturing, and may be made into sprockets or chainwheels. When the sprocket and the chainwheel are assembled on a bicycle, a chain of the bicycle may be moved between the sprocket and the chainwheel by pedaling a pedal of the bicycle, and this enable the bicycle to move.

However, the wear resistance of the conventional carbon fiber toothed structures is poor, when a user rides the bicycle a period of time, toothed structures that deposited on an outer periphery of the conventional sprocket may wear and tear for a long time. Then, the chain of the bicycle cannot tightly engage with the sprocket and may separate from the sprocket, and the user cannot ride the bicycle. Consequently, on the market, there is now a need for a high wear-resistant carbon fiber toothed structure to improve the wear resistance of products that made by the carbon fiber toothed structure.

The surface-reinforced carbon fiber toothed structure in accordance with the present invention mitigates or obviates the aforementioned problems.

SUMMARY OF THE INVENTION

The primary objective of the present invention is to provide a surface-reinforced carbon fiber toothed structure that may be treated by a surface treatment to strengthen a surface of the carbon fiber toothed structure and to increase the life of the carbon fiber toothed structure.

The surface-reinforced carbon fiber toothed structure has a body. The body is circular and has a toothed segment and at least one carbon fiber cloth. The toothed segment is formed on an outer periphery of the body. The at least one carbon fiber cloth is deposited on a front side and a rear side of the body from a center to the outer periphery of the body to cover the toothed segment. The body is made by stacking multiple circular carbon fiber cloths of different diameters with each other. Some of the carbon fiber cloths deposited in the body have smaller diameters than those of the others of the carbon fiber cloths to enable the center of the body to be thicker than the outer periphery of the body. The toothed segment has two guiding inclined planes respectively deposited on the front side and the rear side of the body.

Other objectives, advantages and novel features of the invention will become more apparent from the following detailed description when taken in conjunction with the accompanying drawings.

DETAILED DESCRIPTION OF THE INVENTION

Figure 1:
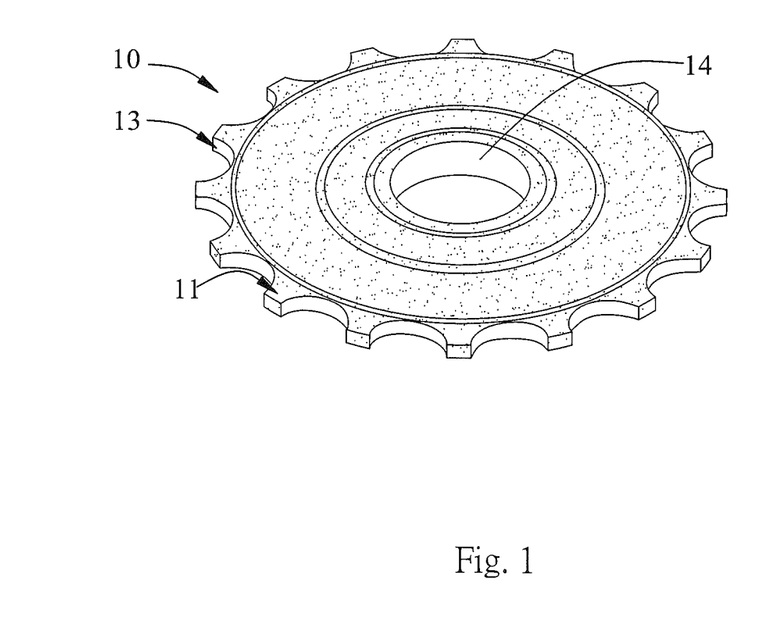
FIG. 1 is a perspective view of a first embodiment of a carbon fiber toothed structure in accordance with the present invention.
Figure 2:
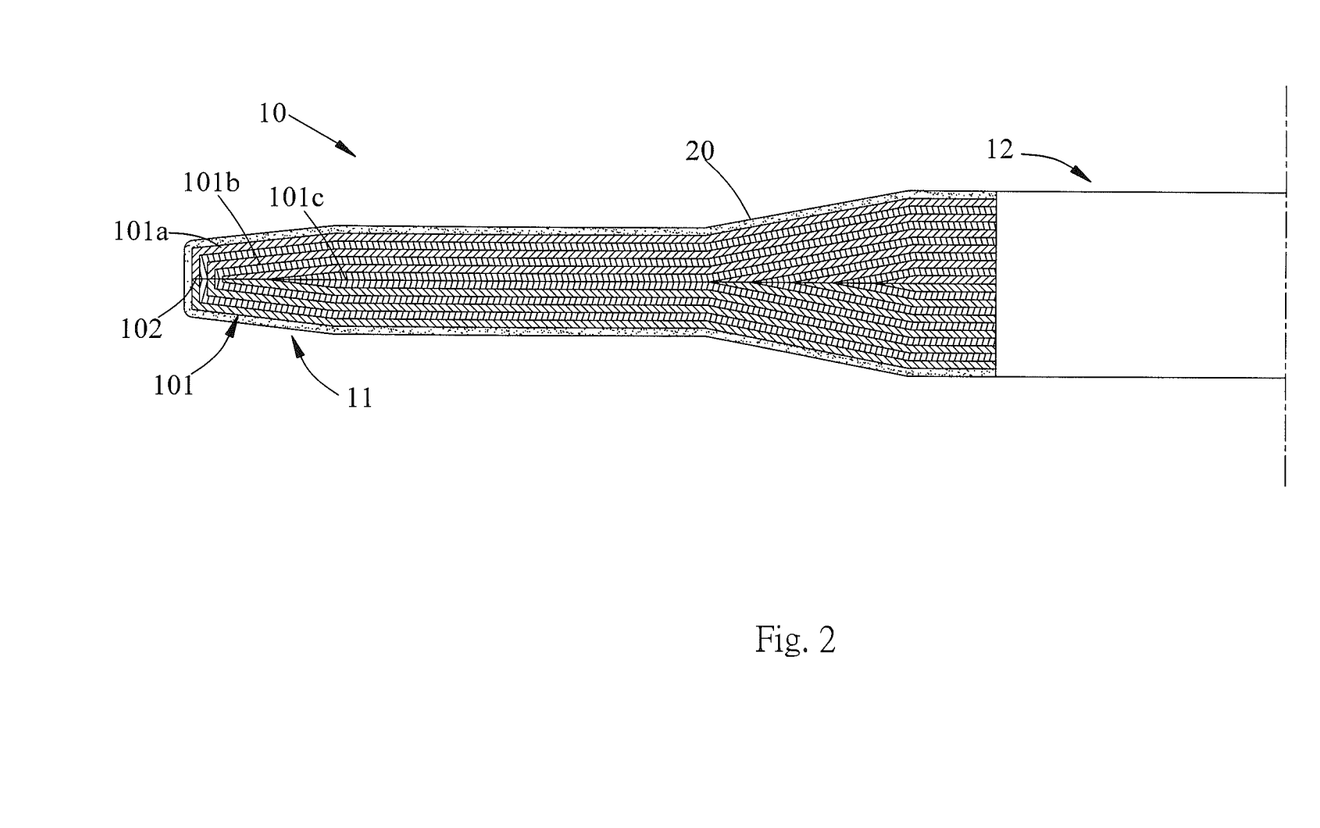
FIG. 2 is an enlarged side view of the carbon fiber toothed structure in FIG. 1.

With reference to FIGS. 1 and 2, a preferred embodiment of a surface-reinforced carbon fiber toothed structure in accordance with the present invention has a body 10.

The body 10 may be a circular sheet and has an outer periphery and a toothed segment 13 formed on the outer periphery of the body 10. In the manufacture of the body 10, the body 10 made by stacking multiple circular carbon fiber cloths 101 of different diameters with each other, and the carbon fiber cloths 101 connected to each other by a hot pressing method. The hot pressing method may be different according to the needs. For example, resin prepare cloths may be selected to use as the carbon fiber cloths 101 and are pressed to form the body 10 after stacking with each other by a vacuum hot forming process.

Additionally, with reference to FIG. 2, the carbon fiber cloths 101 may be further divided into multiple outer carbon fiber cloths 101a, multiple middle carbon fiber cloths 101b, and multiple inner carbon fiber cloths 101c. The body 10 has an axis, a front side, a rear side, and an external surface. At least one of the outer carbon fiber cloths 101a is deposited on the external surface of the body 10 at the front side and the rear side of the body 10, and each one of the outer carbon fiber cloths 101a extends from the axis to the outer periphery of the body 10. Furthermore, each one of the outer carbon fiber cloths 101a has a connecting point 102 deposited on the outer carbon fiber cloth 101a at a central part of the outer periphery of the body 10.

The middle carbon fiber cloths 101b are deposited in the body 10 between the outer carbon fiber cloths 101a that are deposited at the front side and the rear side of the body 10. Each one of the middle carbon fiber cloths 101b has a diameter smaller than a diameter of each one of the outer carbon fiber cloths 101a. The inner carbon fiber cloths 101c are deposited in the body 10 between the middle carbon fiber cloths 101b, and each one of the inner carbon fiber cloths 101c has a diameter smaller than the diameter of each one of the middle carbon fiber cloths 101b.

Furthermore, when the resin was flowable before the carbon fiber cloths 101 has been cured, a wearable layer 20 is deposited on at least one part of the outer carbon fiber cloths 101a at the front side and the rear side of the body 10. After forming the wearable layer 20 on the outer carbon fiber cloths 101a, the body 10 has been cured by the vacuum hot forming process. Additionally, the wearable layer 20 may be composed of metal powder, metal and ceramic mixed powder.

Figure 3:
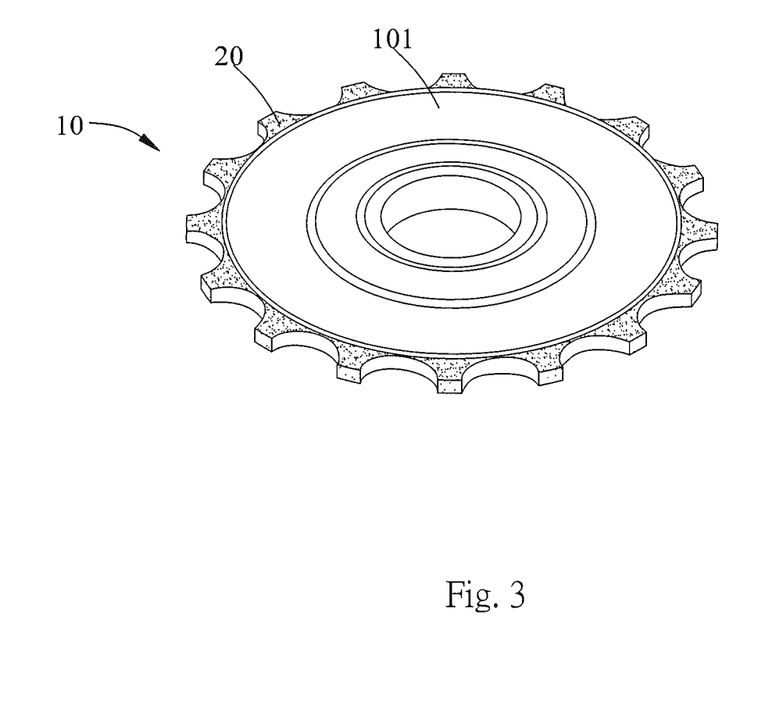
FIG. 3 is a perspective view of a second embodiment of a carbon fiber toothed structure in accordance with the present invention.

After the vacuum hot forming process, a guiding inclined plane 11 is formed on the outer periphery of the body 10 at the front side and the rear side of the body 10 according to the thickness and number of the carbon fiber cloths 101. Furthermore, a central protrusion 12 is formed on the axis of the body 10 and has a thickness thicker than that of the part of the body 10 except for the central protrusion 12. In addition, with reference to FIG. 3, the wearable layer 20 is formed by spraying or coating metal particles on the carbon fiber cloths 101 which have not yet been cured, and it is generally preferable that the metal or ceramic particles are coated on the outer periphery of the body 10 corresponding to the position of the toothed segment 13. Furthermore, a diameter of each one of the wearable particles is from 1 millimeter to 1 nanometer.

The toothed segment 13 is formed on the outer periphery of the body 10 by cutting, and the body 10 has a bearing hole 14 is formed through the central protrusion 12 at the axis of the body 10. The bearing hole 14 has a wall with a height higher than that of part of the body 10 except for the bearing hole 14.

First, the wearable layer 20 is deposited on the front side and the rear side of the body 10 at the portions that may wear easily during use, and the wear resistance of the body 10 may greatly improved by the wearable layer 20 to prevent the body 10 from wearing easily.

Second, the carbon fiber cloths 101 of the body 10 have different diameters, are stacked with each other coaxially and have been cured to form the body 10. The guiding inclined plane 11 that is deposited on the front side and the rear side of the body 10 may be formed with the body 10 as a single piece without post-processing. Then, each guiding inclined plane 11 may not easily wear and this makes the body 10 difficult to delaminate.

Figure 4:
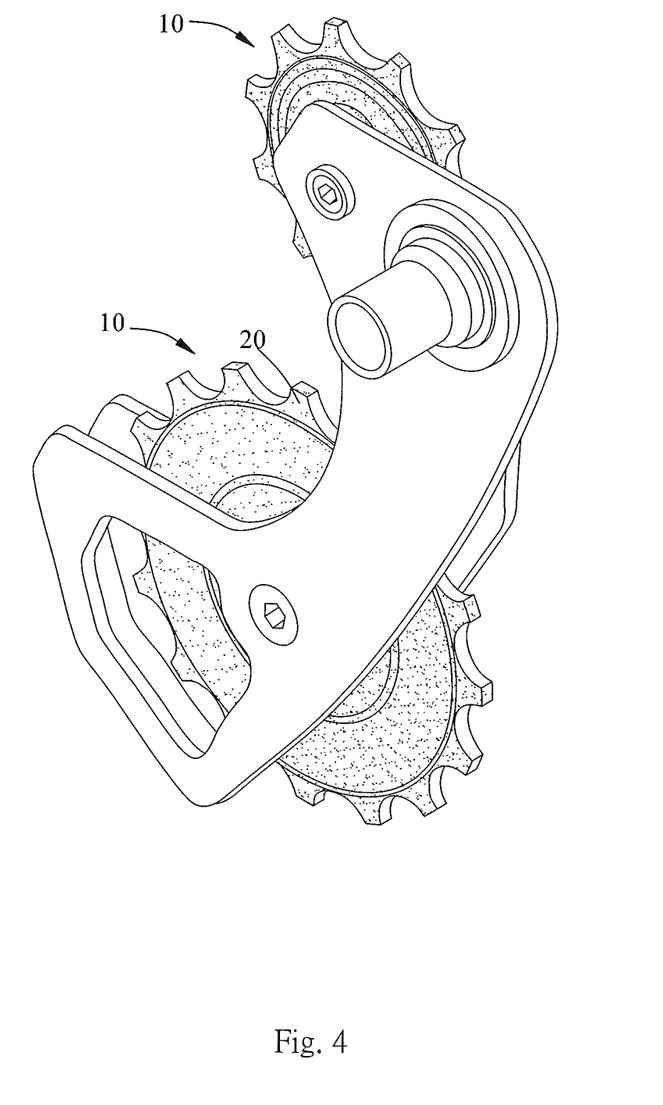
FIG. 4 is a perspective view of a third embodiment of a carbon fiber toothed structure in accordance with the present invention.
Figure 5:
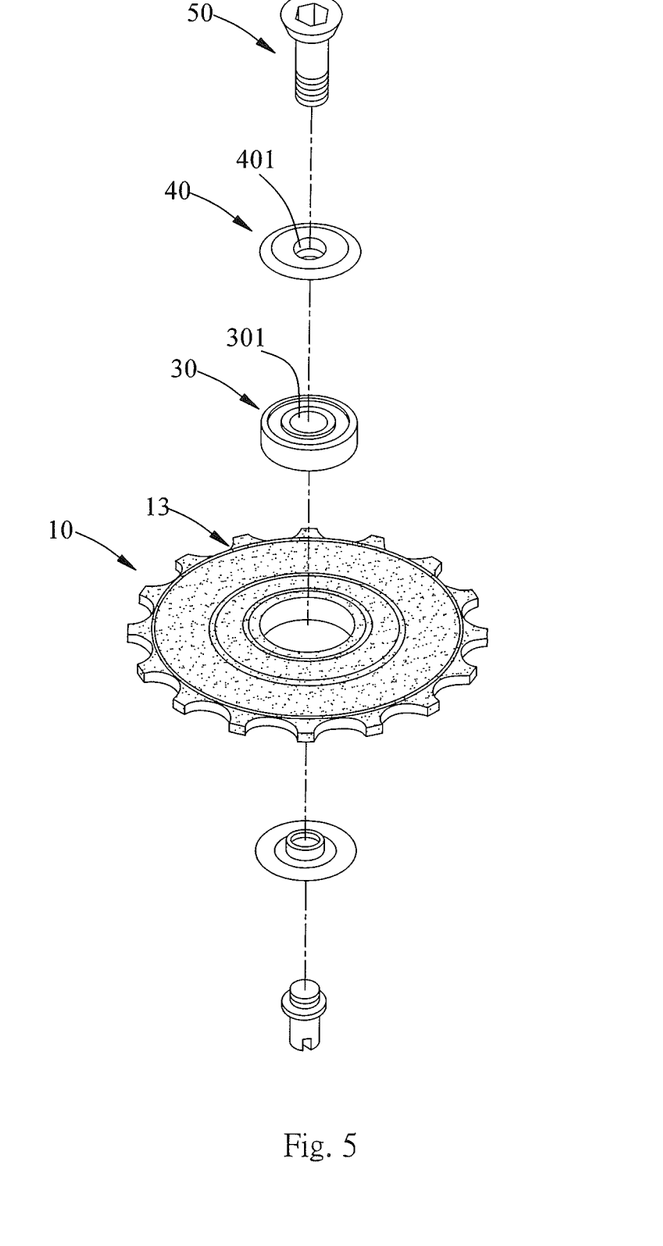
FIG. 5 is an exploded perspective view of the carbon fiber toothed structure in FIG. 4.
Figure 6:
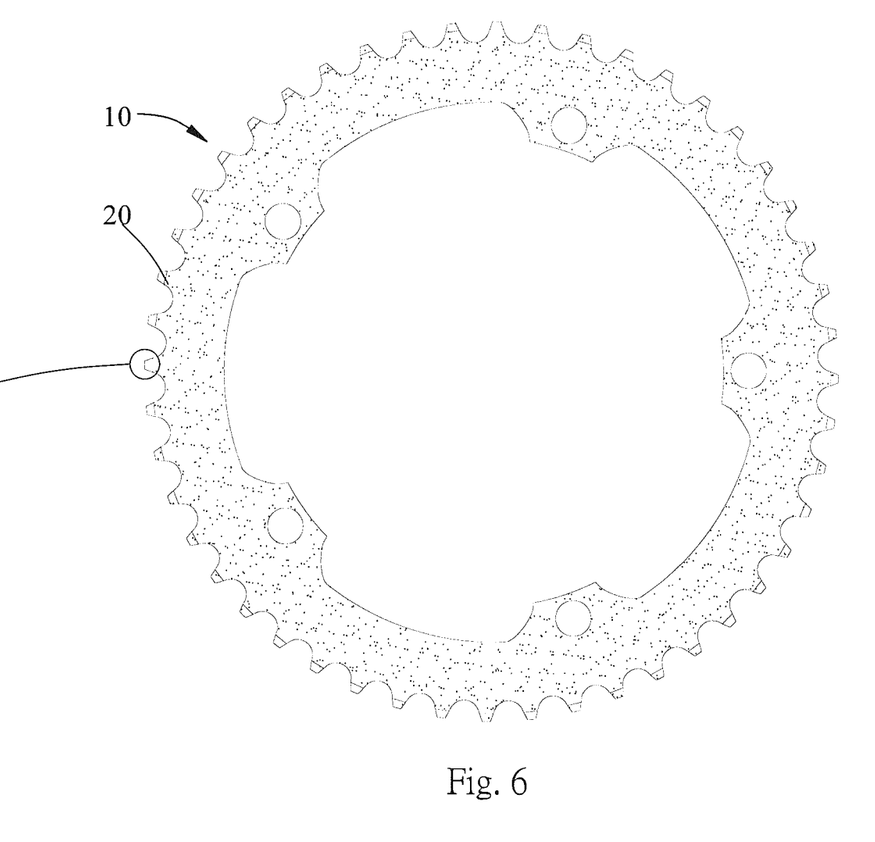
FIG. 6 is a perspective view of a fourth embodiment of a carbon fiber toothed structure in accordance with the present invention.
Figure 6A:
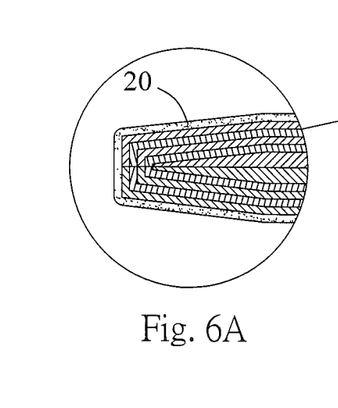
FIG. 6A is an enlarged side view of the carbon fiber toothed structure in FIG. 6.
Figure 7:
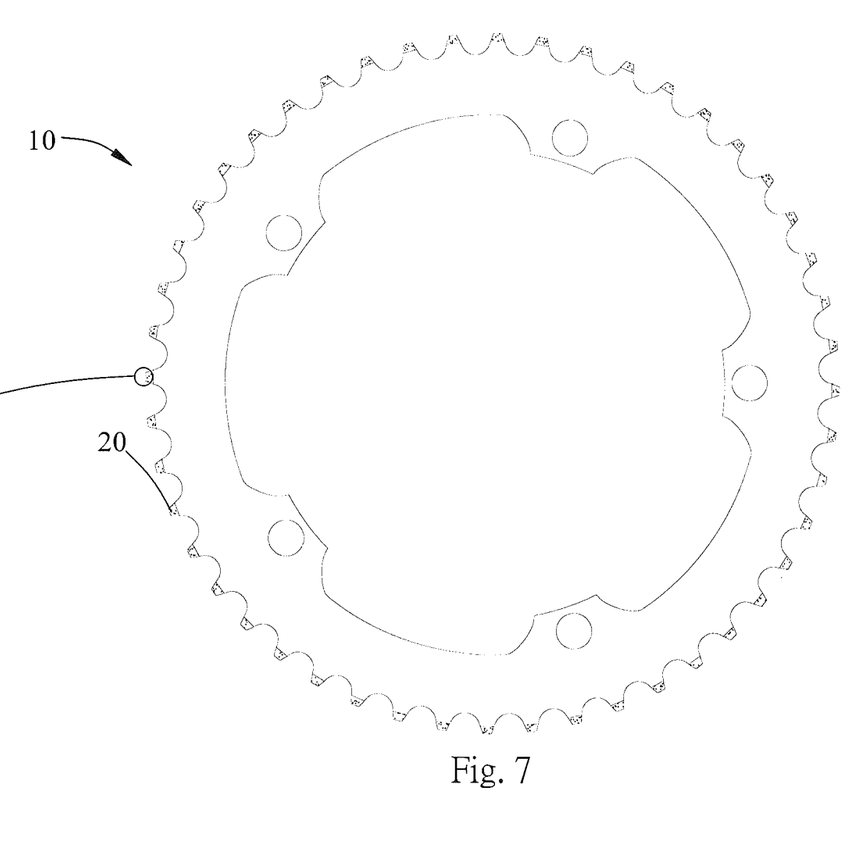
FIG. 7 is a perspective view of a fifth embodiment of a carbon fiber toothed structure in accordance with the present invention.
Figure 7A:
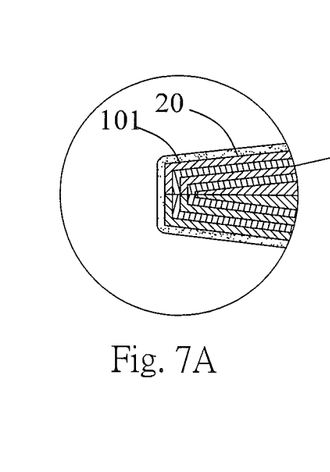
FIG. 7A is an enlarged side view of the carbon fiber toothed structure in FIG. 7.

With reference to FIGS. 4, 5, 6, 6A, 7, and 7A, the surface-reinforced carbon fiber toothed structure of the present invention may be applied in the field of bicycle parts manufacturing such as the sprockets, guiding wheels or chainwheels. When the surface-reinforced carbon fiber toothed structure is applied in the sprockets as shown in FIGS. 4 and 5, the present invention further has a bearing 30, two dust covers 40, and a bolt. The bearing 30 has a shape corresponding to that of the bearing hole 14 of the body 10, and has a bolt hole 301 formed through a center of the bearing 30. The bearing 30 securely engages in the baring hole 14 of the body 10 by a tight manner. Each one of the dust covers 40 has a through hole 401 formed through a center of the dust cover 40, and a diameter larger than a diameter of the bearing 30. The dust covers 40 are respectively mounted on and covered two sides of the bearing 30. The through holes of the dust covers 40 communicate with the bolt hole 301 of the bearing 30. The bolt 50 is inserted through the through holes 401 of the dust covers 40, is connected to the bolt hole 301 of the bearing 30 to cover the sides of the bearing 30 by the dust covers 40 to provide a dust-resisting effect to the bearing 30.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surface-reinforced carbon fiber toothed structure comprising:
   a body being circular and having:
      an outer periphery;
      a front side;
      a rear side;
      a center;
      a toothed segment formed on the outer periphery of the body;
      at least one carbon fiber cloth deposited on the front side and the rear side of the body from the center to the outer periphery of the body to cover the toothed segment of the body;
   the body is made by stacking multiple circular carbon fiber cloths of different diameters with each other;
   some of the multiple carbon fiber cloths deposited in the body have smaller diameters than those of others of the carbon fiber cloths of the body, the center of the body being thicker than the outer periphery of the body; and
   the toothed segment has two guiding inclined planes respectively deposited on the front side and the rear side of the body.

2. The surface-reinforced carbon fiber toothed structure as claimed in claim 1, wherein
   the body has two wearable layers respectively deposited on the front side and the rear side of the body; and
   each one of the wearable layers is made of material that is different from the material of the body.

3. The surface-reinforced carbon fiber toothed structure as claimed in claim 2, wherein
   the carbon fiber cloths of the body have been cured by a vacuum hot forming process to form a central protrusion at the center of the body; and
   the central protrusion has a thickness thicker than that of the part of the body except for the central protrusion.

4. The surface-reinforced carbon fiber toothed structure as claimed in claim 3, wherein each one of the wearable layers is formed on the body by spraying or sprinkling wearable particles on the body.

5. The surface-reinforced carbon fiber toothed structure as claimed in claim 4, wherein the wearable particles comprise metal particles or ceramic particles.

6. The surface-reinforced carbon fiber toothed structure as claimed in claim 5, wherein a diameter of each one of the wearable particles is from 1 millimeter to 1 nanometer.

7. The surface-reinforced carbon fiber toothed structure as claimed in claim 2, wherein the body has a bearing hole formed through the center of the body, and a bearing is tightly mounted in the bearing hole of the body.

8. The surface-reinforced carbon fiber toothed structure as claimed in claim 7, wherein
   the bearing has a bolt hole formed through a center of the bearing; and
   two dust covers are respectively mounted on two sides of the bearing, and each one of the dust covers has a through hole formed through the dust cover.

* * * * *